Figure 1:

United States Patent [19]

Lehmann et al.

[11] Patent Number: 4,477,521
[45] Date of Patent: Oct. 16, 1984

[54] LIGHT TRANSPARENT BODY OF COEXTRUDED SYNTHETIC RESIN

[75] Inventors: Jürgen Lehmann, Reinheim; Heinz Vetter, Rossdorf; Wolfgang Arnold, Bensheim, all of Fed. Rep. of Germany

[73] Assignee: Röhm GmbH, Darmstadt, Fed. Rep. of Germany

[21] Appl. No.: 367,269

[22] Filed: Apr. 12, 1982

[30] Foreign Application Priority Data

May 9, 1981 [DE] Fed. Rep. of Germany ... 8113747[U]

[51] Int. Cl.³ .............................................. B32B 27/36
[52] U.S. Cl. ................................ 428/336; 156/244.11; 156/67; 428/516; 428/519; 428/520; 428/521; 428/522; 428/913; 264/22; 264/171
[58] Field of Search ............... 428/412, 522, 520, 517, 428/521, 913, 336; 156/244.11, 67; 264/22, 171, 40.1

[56] References Cited

U.S. PATENT DOCUMENTS

| 2,880,898 | 4/1959 | Navikas | 215/1 |
|---|---|---|---|
| 3,830,683 | 8/1974 | Rowland | 428/913 |
| 3,933,964 | 1/1976 | Brooks | 264/171 |
| 4,301,209 | 11/1981 | Lorenz et al. | 428/412 |
| 4,339,503 | 7/1982 | Rukavina | 428/412 |
| 4,342,810 | 8/1982 | Adcock | 428/412 |
| 4,348,462 | 9/1982 | Chung | 428/412 |

FOREIGN PATENT DOCUMENTS

| 1073509 | 3/1954 | France . | |
|---|---|---|---|
| 2104771 | 4/1972 | France . | |
| 37-2490 | 5/1962 | Japan | 156/67 |
| 56-8258 | 1/1981 | Japan | 428/412 |
| 56-49265 | 5/1981 | Japan | 428/412 |

*Primary Examiner*—George F. Lesmes
*Assistant Examiner*—E. Rollins Buffalow
*Attorney, Agent, or Firm*—Curtis, Morris & Safford

[57] ABSTRACT

What is disclosed is a light-transparent body comprising a first coextruded layer of a first extrudable light-transparent synthetic resin and a second coextruded layer of a second extrudable light-transparent synthetic resin different from said first resin, wherein said first and second coextruded layers are adjacent and wherein at least said first layer contains a dyestuff capable of fluorescing in the visible region and said second, adjacent, layer is free of the dyestuff present in said first layer.

5 Claims, 2 Drawing Figures

LIGHT TRANSPARENT BODY OF COEXTRUDED SYNTHETIC RESIN

The present invention relates to a light-transparent body comprising a plurality of coextruded layers of synthetic resin and to methods for making the same.

In the manufacture of light-transparent bodies of coextruded synthetic resin comprising at least two layers of different, extrudable, transparent synthetic resins, the difficulty arises of determining the thickness and uniformity of the synthetic resin layers forming the body by observation of its surface or of a cut edge. This difficulty is particularly great if the layers of the body are of the same color or, more particularly, if they are colorless. To be sure, different synthetic resins often have different absorption properties at different wavelengths. Nevertheless, for thin layers it is hard to determine layer thickness sufficiently exactly from the absorption of penetrating radiation of such a wavelength.

The present invention has as its object the preparation of multi-layered coextruded light-transparent bodies of synthetic resin in which the thickness and uniformity of at least one of the layers present can be determined easily and surely by looking at the body or at a cut edge thereof. This object has been achieved by the synthetic resin body described and claimed herein and by the method of making it.

The present invention involves the coloring of at least one layer of such a body with a dye fluorescing in the visible region, which dye preferably does not absorb in the visible region and the fluorescence of which is stimulated by ultraviolet radiation. The light from the fluorescence travels in part through the surface of the resin layer to the outside and can be detected by observing the layer. The remaining portion of the fluorescent light is transmitted within the layer by total reflection and emerges on the cut edges of the layer. Whereas the fluorescent light emerging through the surface is proportional to the layer thickness, the light emerging on a cut edge additionally depends on the size of the area which is irradiated. Non-uniformities in the fluorescing layer are for the most part detectable by simple observation of the irradiated synthetic resin body, without further agencies. For a more exact investigation, a light-measuring apparatus is recommended. A visual observation of the cut edges permits a visual determination of the outline of the fluorescing layer and the form of its boundary surface with the neighboring, non-fluorescing layer. For an exact determination of layer thickness from the intensity of the fluorescent light emerging from an edge, a light-measuring apparatus is usually used. In this case, layer thickness is determined as a function of the intensity of the activiting radiation, of the intensity of the fluorescent light, of the concentration of the fluorescing dye, and of the size and geometry of the test body being investigated. Suitably, a standard curve is prepared which takes these parameters into consideration.

If the synthetic resin body comprises more than two layers, more than one layer thereof may contain a fluorescent dyestuff. However, those layers whose thickness and uniformity are determined should not be adjacent any other layer which contains the same fluorescent dyestuff in an effective amount. However, various layers can contain different fluorescent dyestuffs which emit fluorescent light capable of being differentiated or which are excited to fluorescence by different radiation. If the synthetic resin body contains several fluorescing layers which are separated by non-fluorescing layers, the fluorescent light detectable by observation under certain circumstances given only information concerning the sum of the thicknesses of the fluorescing layers. The separating layers can have an absorbent effect on the irradiation which initiates fluorescence, so that if the irradiation is from one side of the body only, only one of the layers containing a fluorescent dyestuff may fluoresce. In this case, two separated layers can be investigated separately for their uniformity from both sides of the body.

Figure 2:
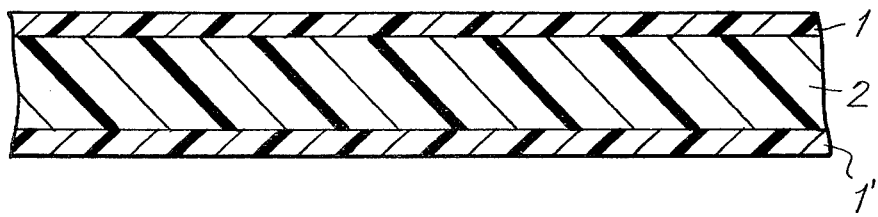

A better understanding of the present invention will be had by referring to the accompanying drawings, in which FIG. 1 is a side view, in section, of a portion of a first embodiment of the invention; and FIG. 2 is a side view, in section, of a portion of a second embodiment according to the invention.

Both FIGS. 1 and 2 show a body of coextruded synthetic resin comprising a non-fluorescing layer 2 having thereon at least one adjacent fluorescing layer 1, as particularly shown in FIG. 1. In the embodiment of FIG. 2, the body comprises a second fluorescing layer 1', with layers 1 and 1' forming the exterior sides of the synthetic resin body.

Suitable fluorescent dyestuffs which are preferably colorless in the visible region and which can be homogeneously distributed in thermoplastic forming masses are known in the art. Dyestuffs which can be stimulated by ultraviolet radiation in the region from 230 to 380 nanometers and which emit blue fluorescent light are preferred. Examples of such kinds of fluorescent dyestuffs are derivatives of 4,4'-bis-triazinylamino-stilbene-2,2'-disulfonic acid, coumarin, bis-benzoxazolyl compounds, bis-benzimidazolyl compounds, benztriazoles, pyrazolines, naphthalic acid imides, and bis-styryl-benzene. If the fluorescent dyestuff merely serves for monitoring the preparation of the body, it need only be stable for a short period of time. The fluorescent dyestuffs are suitably added in a concentration from 1 to 10,000 parts per million, preferably from 100 to 1,000 parts per million (i.e. 0.01 to 0.1%), calculated on the weight of the synthetic resin.

In the preferred case, all layers of the synthetic resin body are transparent and colorless. The non-fluorescing layer, which as a rule forms the core of the synthetic resin body and is the heaviest layer, can be a solid body or can define a hollow body, for example a hollow body such as a tube or a double walled sheet the walls of which are supported by intermediate supports. The layer thickness can be from 1 to 10 millimeters, for example, without taking into consideration any cavities: in the case of films having many layers, the layer thickness can also be less than this. The fluorescing layer is as a rule less than 1 mm thick and, preferably, at most 0.1 mm thick. Thicknesses below 0.001 mm are no longer suitable for the fluorescing layer, since they are difficult to prepare and the fluorescent effect is also then too weak. For the reasons discussed above, but also for protection against weathering, it can be suitable to provide the non-fluorescing layer with an ultraviolet absorber in conventional amounts. Suitable absorbers are, for example, esters of 2-cyano-3,3-diphenyl-acrylic acid, benzophenone, and benztriazoles such as 2-hydroxy-5-methyl-phenylbenztriazole. The fluorescing layers can contain ultraviolet absorbers of such a nature and in such amounts that the fluorescent effect is not annulled.

The outer layer of a multi-layered coextruded body of synthetic resin often must protect the underlying layers from the influence of weathering and for this reason as a rule is generally made of a material which is highly weather resistant. Polymethylmethacrylate or copolymeric synthetic resins predominantly comprising methyl methacrylate are preferred. These resins are often also suitable as adhesion promoters for further layers to be applied thereto, for example scratch-resistant layers. The preferred synthetic resin bodies according to the present invention thus contain one or two surface layers from the aforementioned homo- or copolymers of methyl methacrylate which contains a fluorescent dyestuff. The core preferably comprises a layer of a different resin, for example a polycarbonate— which is preferred—, or of polyvinyl chloride, impact-resistant modified polymethylmethacrylate resins, polyethylene, polystyrene, or styrenebutadiene copolymers. It is self-explanatory that all the layers must consist of thermoplastic extrudable synthetic resins.

The technique of coextruding different synthetic resins which are melted in separated extruders and are brought together in a common co-extrusion nozzle to form a multi-layered synthetic resin body is known in the art and is performed in its usual manner for the purposes of the present invention. However, at least one thermoplastic extrudable, light-transparent forming mass is used which contains a dyestuff capable of fluorescing in the visible region, whereas at least one further, different, forming mass is also employed which does not contain this dyestuff. Suitably, the continuously flowing synthetic resin sheet is irradiated with radiation providing fluorescence somewhere after leaving the extrusion nozzle, but in any event before that site in the emerging strand of the body at which the strand is cut up into segments or is rolled up. In this way, possible non-uniformities in the fluorescing layer can be detected by visual observation. For a more certain determination, a cut edge can be continuously or periodically produced and the fluorescent light emerging therefrom can be measured.

A better understanding of the present invention and of its many advantages will be had by referring to the following specific Example, given by way of illustration.

EXAMPLE 1

Preparation of polycarbonate panels having good transparency and good resistance to weathering Good weather resistance is obtained by coating with a thin film of polymethylmethacrylate (PMMA). So that the toughness properties of the polycarbonate (PC) panels are maintained as much as possible, the PMMA layer shall not be thicker than 30 microns.

A glass-clear polycarbonate train, 400 mm wide and 3 mm thick, is formed at a temperature of 270° C. using a coextrusion nozzle having a nozzle imput of 0.4 meter/minute and is simultaneously covered with glass-clear polymethylmethacrylate at 220° C. in the nozzle, using a three-layer nozzle [cf. multi-layered nozzles in Michaeli, "Extrusionswerkzeug fuer Kunststoffe" ("Extrusion Apparatus for Synthetic Resins"), Hanser Verlag 1979]. For control of the thickness distribution of the PMMA-layer, an adjustable dam is present in the nozzle, as usual.

In advance, 0.02 percent of 2,5-bis[s'-t-butylbenzoxazolyl(2')]thiophene, an optical brightener commercially available under the name "UVITEX OB", is added to the PMMA granulate fed to the PMMA extruder. The nozzle exit is extensively protected from daylight. The surface of the emerging train is irradiated with a mercury high-pressure radiation source having a black-glass bulb of the HQV type, 125 watts, manufactured by Osram. It can be determined, from variations in the fluorescence, if the polycarbonate train is uniformly coated all over with PMMA. If this is not the case, the flow of forming material is corrected using the dam. In this way, the PMMA layer thickness can be maintained in the region from 20-30 microns over a production time of several hours.

What is claimed is:

1. A light transparent body comprising a first coextruded layer, at most 0.1 millimeter thick, of a first extrudable light-transparent synthetic resin and a second coextruded layer of a second extrudable light-transparent synthetic resin different from said first resin selected from the group consisting of a polycarbonate resin, polymethylmethacrylate resin and a synthetic copolymeric resin predominatly comprising methyl methacrylate, said first and second coextruded layers being adjacent, said first layer containing distributed homogeneously therethrough a dyestuff capable of fluorescing in the visible region under ultraviolet radiation, and said second layer being free of the dyestuff present in said first layer, whereby said first layer is detectible and distinguishable from said second layer when under ultraviolet radiation.

2. A light transparent body as in claim 1 wherein said first layer is of a polycarbonate resin.

3. A light-transparent body as in claim 1 wherein said first layer containing said dyestuff is of polymethylmethacrylate resin or of a synthetic copolymeric resin predominantly comprising methyl methacrylate.

4. A method for making a light transparent body as in claim 1 which comprises coextruding at least first and second thermoplastic forming masses of light-transparent synthetic resin through a common extrusion nozzle to form a body comprising at least first and second adjacent coextruded layers respectively derived from said first and second forming masses, at least said first forming mass and said first layer derived therefrom having homogeneously distributed therethrough a dyestuff capable of fluorescing in the visible region under ultraviolet radiation, said second forming mass and said second layer derived therefrom being free of the dyestuff present in said first forming mass and said first layer, whereby said first layer is detectible and distinguishable from said second layer when under ultraviolet radiation.

5. A method as in claim 4 wherein said light-transparent body is irradiated, after leaving said common extrusion nozzle, with radiation stimulating the fluorescence of said dyestuff.

* * * * *